United States Patent
Aronowitz et al.

(10) Patent No.: US 10,375,119 B2
(45) Date of Patent: Aug. 6, 2019

(54) DYNAMIC MULTI-FACTOR AUTHENTICATION CHALLENGE GENERATION

(71) Applicant: International Business Machines Corporation, Armonk, NY (US)

(72) Inventors: Hagai Aronowitz, Petah-Tikva (IL); Lawrence Koved, Pleasantville, NY (US); Ian M. Molloy, Chappaqua, NY (US); Bo Zhang, Hoboken, NJ (US)

(73) Assignee: International Business Machines Corporation, Armonk, NY (US)

( * ) Notice: Subject to any disclaimer, the term of this patent is extended or adjusted under 35 U.S.C. 154(b) by 107 days.

(21) Appl. No.: 15/221,620

(22) Filed: Jul. 28, 2016

(65) Prior Publication Data
US 2018/0034859 A1    Feb. 1, 2018

(51) Int. Cl.
G06F 7/04 (2006.01)
G06F 15/16 (2006.01)
G06F 17/30 (2006.01)
H04L 29/06 (2006.01)

(52) U.S. Cl.
CPC .......... *H04L 63/205* (2013.01); *H04L 63/08* (2013.01); *H04L 63/1466* (2013.01); *H04L 63/0861* (2013.01); *H04L 2463/082* (2013.01)

(58) Field of Classification Search
CPC ............ H04L 63/205; H04L 63/0861; H04L 2463/082
See application file for complete search history.

(56) References Cited

U.S. PATENT DOCUMENTS

| | | | |
|---|---|---|---|
| 5,442,342 A | 8/1995 | Kung | |
| 7,519,985 B2* | 4/2009 | Kawamura | H04W 12/12 380/270 |
| 7,941,669 B2* | 5/2011 | Foley | H04L 63/083 713/182 |
| 8,584,219 B1* | 11/2013 | Toole | G06F 21/60 726/25 |
| 8,695,105 B2 | 4/2014 | Mahendrakar et al. | |
| 8,719,911 B2 | 5/2014 | Novack et al. | |
| 9,355,234 B1* | 5/2016 | Magi Shaashua | G06F 21/32 |
| 9,485,237 B1* | 11/2016 | Johansson | H04L 63/08 |

(Continued)

OTHER PUBLICATIONS

Castro et al., "Runtime adaptive multi-factor authentication for mobile devices," IBM Journal of Research and Development, vol. 57, Issue 6, Nov./Dec. 2013, pp. 8:1-8:17.

(Continued)

*Primary Examiner* — John B King
*Assistant Examiner* — Darshan I Dhruv
(74) *Attorney, Agent, or Firm* — Yee & Associates, P.C.; Jeffrey LaBaw

(57) ABSTRACT

Dynamic multi-factor authentication challenge selection is provided. A risk associated with an operation that requires authentication of a user of a client device is determined. A plurality of authentication methods is identified. Each respective authentication method associated with a level of security offsetting the risk and a computing cost associated with a respective authentication method. One or more authentication methods are selected from the plurality of authentication methods according to the risk and to minimize the computing cost associated with authenticating the operation.

16 Claims, 6 Drawing Sheets

(56) References Cited

U.S. PATENT DOCUMENTS

| | | | | |
|---|---|---|---|---|
| 9,754,257 B1* | 9/2017 | Hughes | | G06F 21/31 |
| 10,019,561 B1* | 7/2018 | Shelton | | G10L 17/00 |
| 2005/0138421 A1* | 6/2005 | Fedronic | | G06F 21/32 |
| | | | | 726/4 |
| 2006/0282660 A1* | 12/2006 | Varghese | | G06Q 20/341 |
| | | | | 713/155 |
| 2008/0059797 A1* | 3/2008 | Tokuno | | H04L 63/0853 |
| | | | | 713/171 |
| 2008/0244611 A1* | 10/2008 | Doyle | | G06F 9/5061 |
| | | | | 718/105 |
| 2009/0287962 A1 | 7/2009 | Brenneman et al. | | |
| 2011/0209200 A2* | 8/2011 | White | | G06F 21/32 |
| | | | | 726/4 |
| 2012/0054741 A1* | 3/2012 | Ali | | H04L 9/3231 |
| | | | | 718/1 |
| 2012/0272335 A1* | 10/2012 | Mahendrakar | | H04L 63/10 |
| | | | | 726/28 |
| 2013/0031641 A1* | 1/2013 | Fisk | | G06F 21/31 |
| | | | | 726/28 |
| 2013/0067547 A1* | 3/2013 | Thavasi | | G06F 21/31 |
| | | | | 726/7 |
| 2014/0282945 A1* | 9/2014 | Smith | | G06F 21/32 |
| | | | | 726/6 |
| 2015/0046969 A1* | 2/2015 | Abuelsaad | | G06F 21/41 |
| | | | | 726/1 |
| 2015/0186633 A1* | 7/2015 | Chow | | H04L 63/08 |
| | | | | 726/19 |
| 2015/0310188 A1 | 10/2015 | Ford et al. | | |
| 2015/0363582 A1* | 12/2015 | Sheller | | G06F 21/31 |
| | | | | 726/17 |
| 2015/0381598 A1* | 12/2015 | Koved | | H04L 63/08 |
| | | | | 726/3 |
| 2016/0012270 A1* | 1/2016 | Xu | | G06K 9/00885 |
| | | | | 382/115 |
| 2016/0055326 A1* | 2/2016 | Votaw | | G06F 21/316 |
| | | | | 726/19 |
| 2016/0255154 A1* | 9/2016 | Kim | | G09C 1/00 |
| | | | | 726/25 |
| 2016/0308723 A1* | 10/2016 | Ganguli | | H04L 41/0893 |
| 2016/0359838 A1* | 12/2016 | Dasgupta | | H04L 63/083 |
| 2017/0070510 A1* | 3/2017 | Ramalingam | | H04L 63/08 |
| 2017/0331505 A1* | 11/2017 | Shim | | H04B 1/385 |
| 2017/0364674 A1* | 12/2017 | Grubbs | | G06F 21/34 |

OTHER PUBLICATIONS

Nag et al., "An Adaptive Approach for Active Multi-Factor Authentication," 9th Annual Symposium on Information Assurance (ASIA'14), Jun. 2014, pp. 39-47.

* cited by examiner

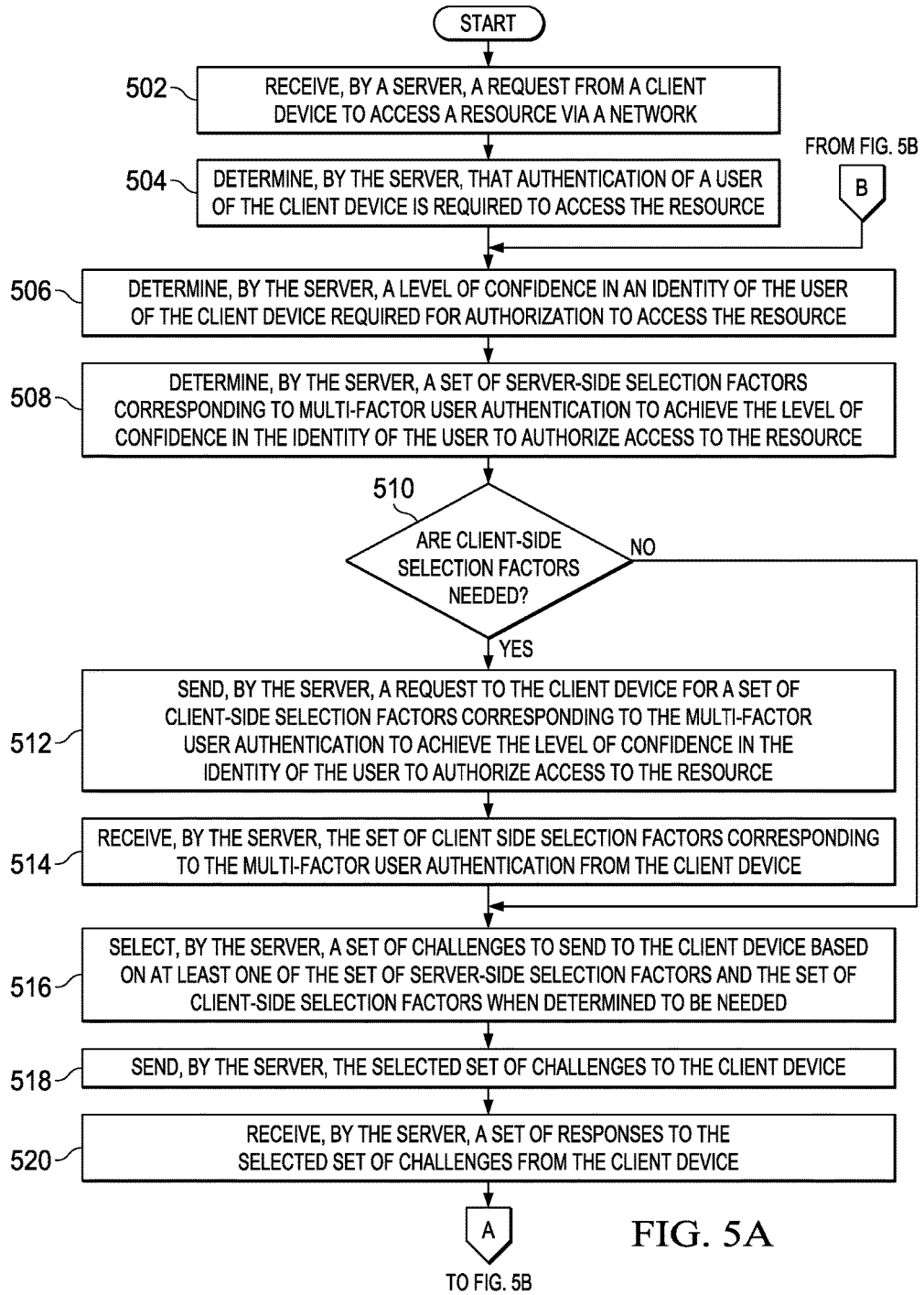

DYNAMIC MULTI-FACTOR AUTHENTICATION CHALLENGE GENERATION

BACKGROUND

1. Field

The disclosure relates generally to user authentication and more specifically to selecting a set of one or more challenges to determine a level of confidence in an identity of a user based on a plurality of selection factors in a multi-factor user authentication process.

2. Description of the Related Art

Authentication is the process of verifying an identity of a user during resource or information access and many other transactions. Logically, authentication precedes authorization to access a resource. Multi-factor authentication requires more than one method of authentication from independent categories of credentials to verify the user's identity.

Authentication services typically use multiple authentication factors to make an authorization decision. The use of multiple factors increases security due to the unlikelihood that an attacker could provide all of the elements required for authentication. Each additional factor increases the security of the system and decreases the likelihood that it could be breached.

SUMMARY

According to one illustrative embodiment, a computer-implemented method for dynamic multi-factor authentication challenge selection is provided. A computer determines a risk associated with an operation that requires authentication of a user of a client device. The computer identifies a plurality of authentication methods, each respective authentication method associated with a level of security offsetting the risk and a computing cost associated with a respective authentication method. The computer selects one or more authentication methods from the plurality of authentication methods according to the risk and to minimize the computing cost associated with authenticating the operation. According to other illustrative embodiments, a computer system and computer program product for dynamic multi-factor authentication challenge selection are provided. In particular, a mechanism for configuring additional challenges when the user fails the first (few) challenge(s) is provided.

BRIEF DESCRIPTION OF THE DRAWINGS

FIGS. 5A-5B are a flowchart illustrating a process for selecting challenges in multi-factor user authentication in accordance with an alternative illustrative embodiment.

DETAILED DESCRIPTION

Figure 1:
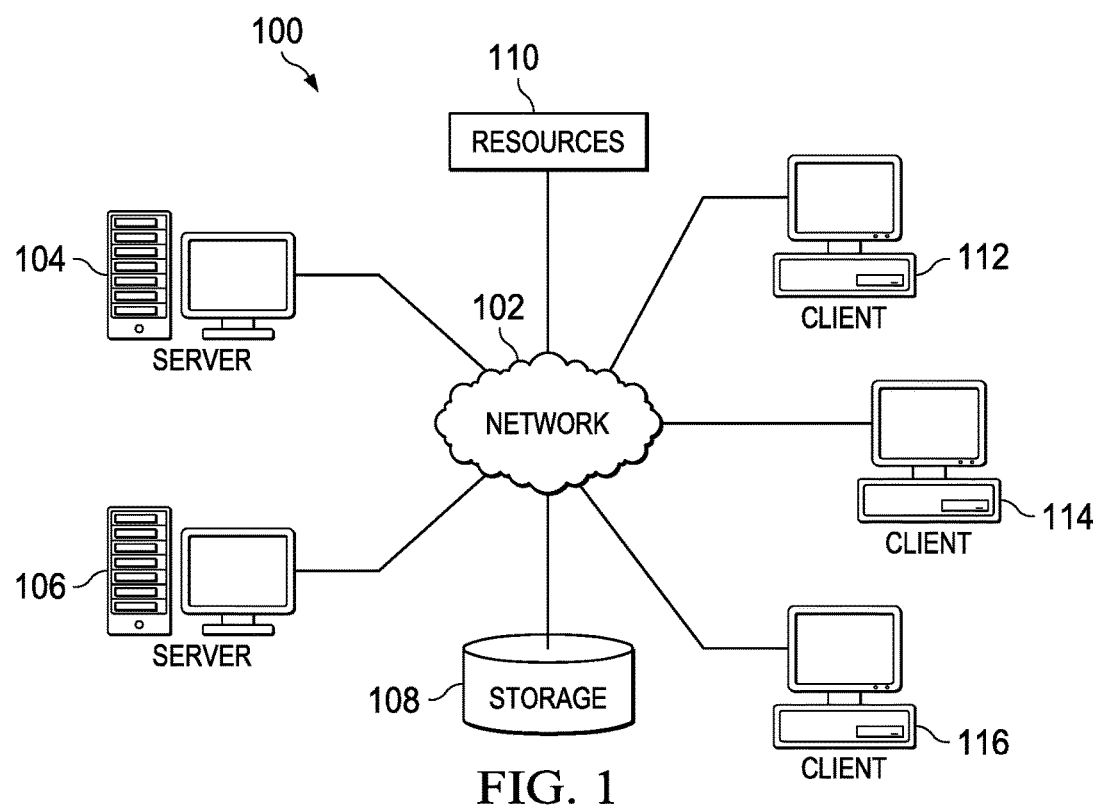
FIG. 1 is a pictorial representation of a network of data processing systems in which illustrative embodiments may be implemented.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer readable program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
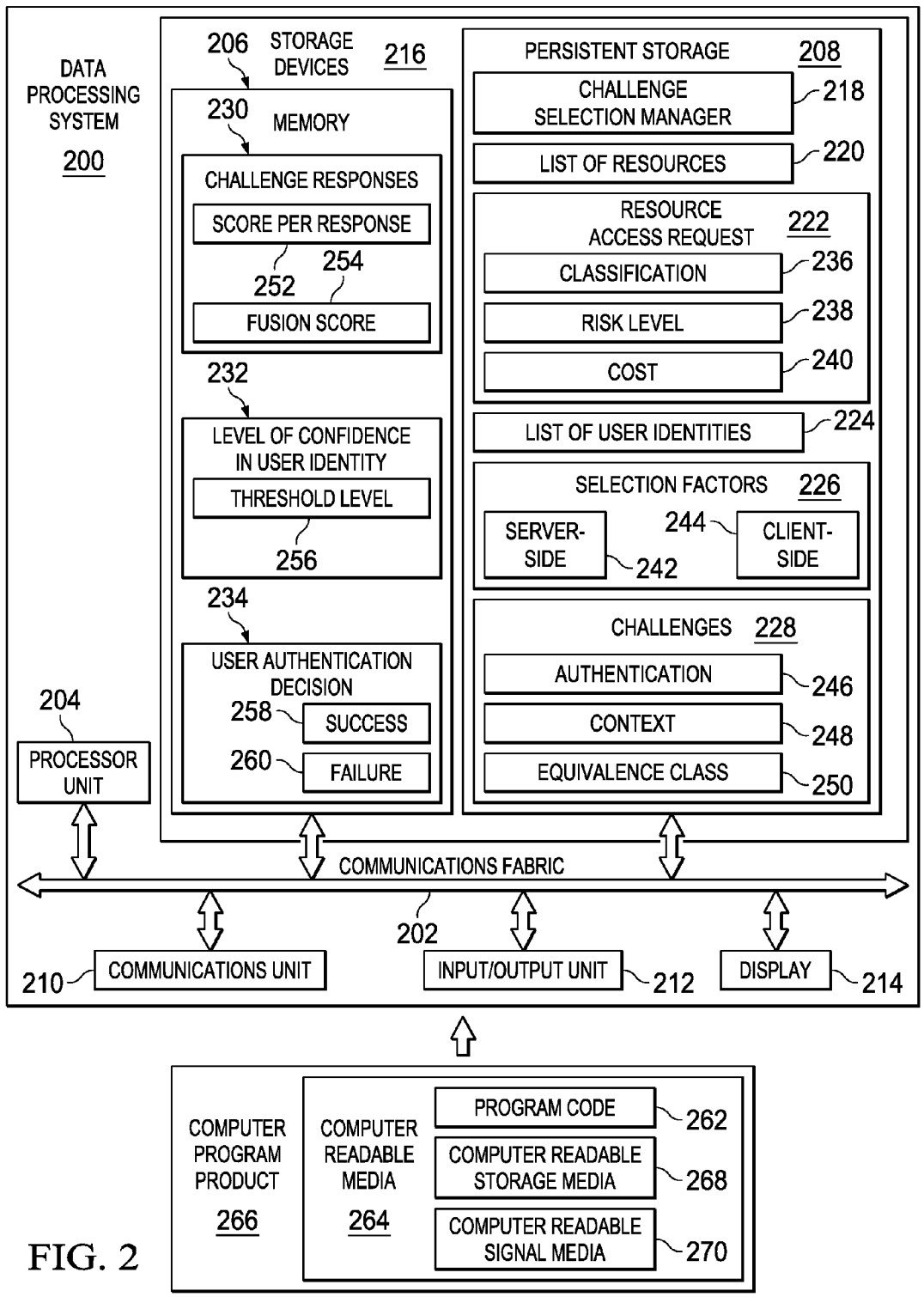
FIG. 2 is a diagram of a data processing system in which illustrative embodiments may be implemented.
Figure 3:
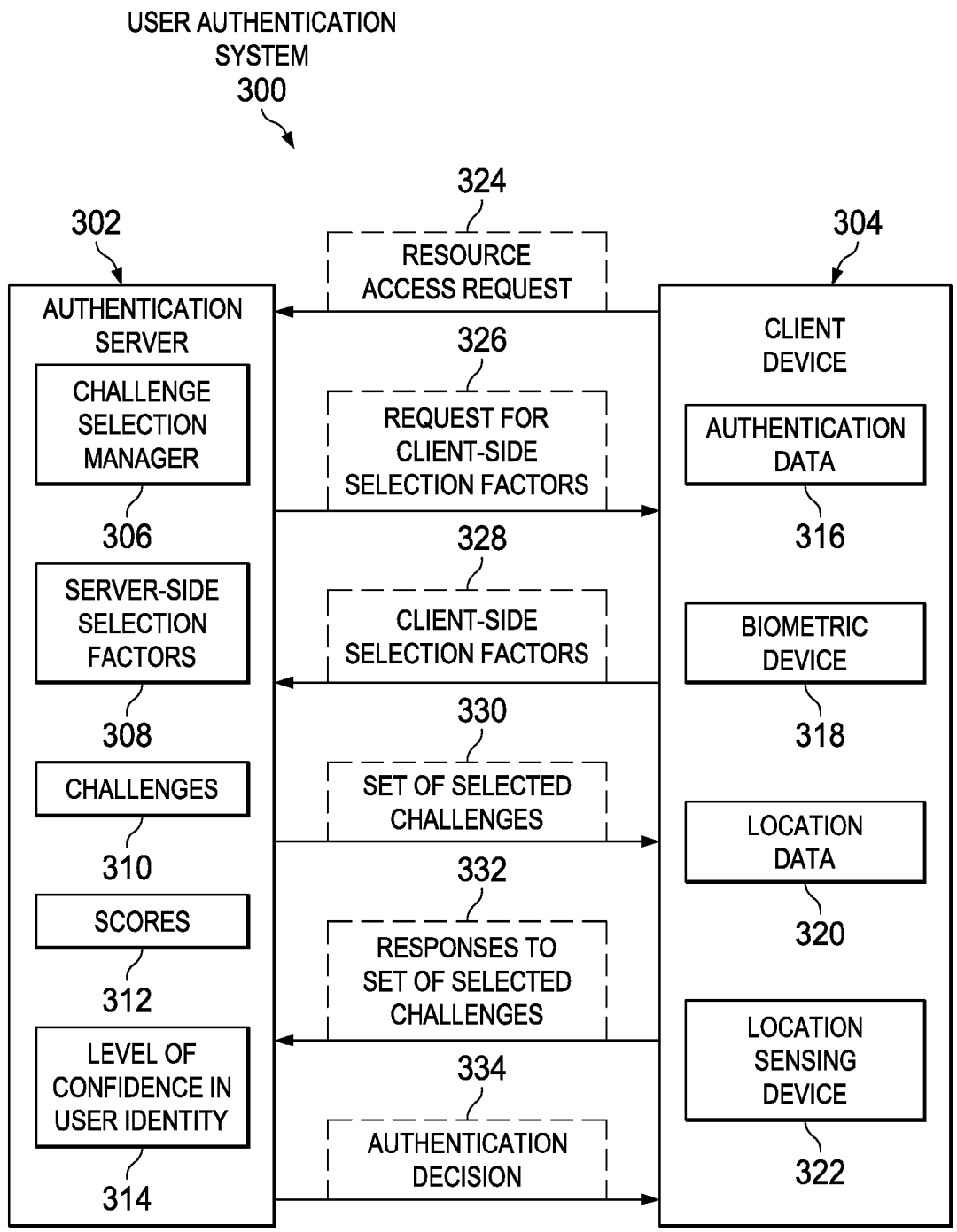
FIG. 3 is a diagram illustrating a user authentication system in which illustrative embodiments may be implemented.

With reference now to the figures, and in particular, with reference to FIGS. 1-3, diagrams of data processing environments are provided in which illustrative embodiments may be implemented. It should be appreciated that FIGS. 1-3 are only meant as examples and are not intended to assert or imply any limitation with regard to the environments in which different embodiments may be implemented. Many modifications to the depicted environments may be made.

FIG. 1 depicts a pictorial representation of a network of data processing systems in which illustrative embodiments may be implemented. Network data processing system 100 is a network of computers, data processing systems, and other devices in which the illustrative embodiments may be implemented. Network data processing system 100 contains network 102, which is the medium used to provide communications links between the computers, data processing systems, and other devices connected together within network data processing system 100. Network 102 may include connections, such as, for example, wire communication links, wireless communication links, and fiber optic cables.

In the depicted example, server 104 and server 106 connect to network 102, along with storage 108. Server 104 and server 106 may be, for example, server computers with high-speed connections to network 102 and may each represent a set of one or more server computers. In addition, server 104 and server 106 may be authentication servers that protect resources 110 from unauthorized user access by providing multi-factor user authentication services. A multi-factor user authentication service verifies whether a requesting client device user is authentic based on responses to a set of two or more challenges during an authentication process. Resources 110 represent a plurality of different protected resources. A protected resource may be, for example, sensitive data, such as personal information, account information, or transaction information, secret documents, such as trade secrets, restricted access websites or web pages, hardware devices, such as processors or storage devices, software components, such as applications or programs, networks, network communication devices, and the like. However, it should be noted that resources 110 may represent any type of protected resource corresponding to individuals, businesses, enterprises, governmental agencies, organizations, institutions, and the like.

Client 112, client 114, and client 116 also connect to network 102. Clients 112, 114, and 116 are clients of server 104 or server 106. Server 104 and server 106 may provide information, such as boot files, operating system images, and software applications to clients 112, 114, and 116.

In this example, clients 112, 114, and 116 are shown as desktop computers that may include wire or wireless communication links to network 102. However, it should be noted that clients 112, 114, and 116 are intended as examples only. In other words, clients 112, 114, and 116 also may include other devices, such as, for example, laptop computers, handheld computers, smart phones, smart watches, personal digital assistants, gaming devices, kiosks, set-top boxes, or any combination thereof. Users of clients 112, 114, and 116 may use client devices 112, 114, and 116 to access resources 110, which have restricted access and are protected by server 104 and server 106 using multi-factor user authentication.

Storage 108 is a network storage device capable of storing any type of data in a structured format or an unstructured format. In addition, storage 108 may represent a set of one or more network storage devices. Storage 108 also may be protected by server 104 or server 106. Storage 108 may store, for example, names and identification data corresponding to a plurality of different client device users, user account information, user profiles, biometric templates corresponding to respective users, and the like. A biometric template is a digital representation of a client device user's distinct characteristics that have been extracted from a biometric sample. The biometric sample of the user may be obtained by, for example, a fingerprint scan, a palm scan, a retinal scan, a facial scan, a voice scan, a magnetic resonance imaging scan, a computer-assisted tomography scan, an electroencephalogram, an electrocardiogram, and the like. The biometric template may be used during a process to authenticate a user of a client device.

In addition, it should be noted that network data processing system 100 may include any number of additional server devices, client devices, and other devices not shown. Program code located in network data processing system 100 may be stored on a computer readable storage medium and downloaded to a computer or other data processing device for use. For example, program code may be stored on a computer readable storage medium on server 104 and downloaded to client 112 over network 102 for use on client 112.

In the depicted example, network data processing system 100 may be implemented as a number of different types of communication networks, such as, for example, an internet, an intranet, a local area network (LAN), and a wide area network (WAN). FIG. 1 is intended as an example and not as an architectural limitation for the different illustrative embodiments.

With reference now to FIG. 2, a diagram of a data processing system is depicted in accordance with an illustrative embodiment. Data processing system 200 is an example of a computer, such as server 104 in FIG. 1, in which computer readable program code or program instructions implementing processes of illustrative embodiments may be located. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software applications and programs that may be loaded into memory 206. Processor unit 204 may be a set of one or more hardware processor devices or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A computer readable storage device is any piece of hardware that is capable of storing information, such as, for example, without limitation, data, computer readable program code in functional form, and/or other suitable information either on a transient basis and/or a persistent basis. Further, a computer readable storage device excludes a propagation medium. Memory 206, in these examples, may be, for example, a random access memory, or any other suitable volatile or non-volatile storage device. Persistent storage 208 may take various forms, depending on the particular implementation. For example, persistent storage 208 may contain one or more devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

In this example, persistent storage 208 stores challenge selection manager 218. Challenge selection manager 218 selects a set of one or more challenges for determining a level of confidence in an identity of a user of a requesting client device, such as client 112 in FIG. 1, based on a plurality of selection factors. Further, challenge selection manager 218 verifies the identity of the user based on responses to the set of challenges received from the requesting client device during the user authentication process. It should be noted that even though challenge selection manager 218 is illustrated as residing in persistent storage 208, in an alternative illustrative embodiment challenge selection manager 218 may be a separate component of data processing system 200. For example, challenge selection manager 218 may be a hardware component coupled to communication fabric 202 or a combination of hardware and software components.

Also in this example, persistent storage 208 stores list of resources 220, resource access request 222, list of user identities 224, selection factors 226, and challenges 228. However, it should be noted that alternative illustrative embodiments may include more or less data than illustrated in persistent storage 208.

List of resources 220 represents a listing of all resources that are protected by data processing system 200. List of resources 220 may include other information, such as, for example, identification data, network location data, resource value, resource risk, and the like, for each protected resource listed.

Resource access request 222 represents a request from a client device to access a protected resource, such as a resource in resources 110 in FIG. 1. It should be noted that resource access request 222 may represent a plurality of different resource access requests received from a plurality of different client devices. Challenge selection manager 218 determines classification 236, risk level 238, and cost 240 associated with resource access request 222. Classification 236 represents a plurality of different resource access request classifications that challenge selection manager 218 may place resource access request 222 within. Also, classification 236 may be associated with risk level 238. Risk level 238 represents a plurality of different risk levels that may be associated with different resource access requests. Risk level 238 may be, for example, a low risk level, a medium risk level, or a high risk level depending upon which classification challenge selection manager 218 places resource access request 222 within. Cost 240 represents a cost associated with resource access request 222. Cost 240 may be, for example, a computational cost, a network cost, and the like.

List of user identities 224 represents a listing of all client device users that are registered with data processing system 200. List of user identities 224 may include other information, such as, for example, identification data, account data, user profiles, user preferences, user resource access history, usernames, passwords, biometric templates, and the like, for each registered user listed.

Selection factors 226 represent a plurality of different challenge selection factors that challenge selection manager 218 utilizes to determine which subset of challenges in set of challenges 228 are to be sent to the requesting client device for authentication of the user. The plurality of different challenge selection factors may include, for example, user experience factors, environmental factors, authentication strength factors, computational cost factors, network cost factors, authentication service factors, contextual factors, user history factors, user trust level factors, value of resource at risk factors, and the like. Data processing system 200 may receive the plurality of different challenge selection factors from a plurality of different sources, such as, for example, stored records in persistent storage 208, online database sources, internet sources, enterprise network sources, social media network sources, risk assessment expert sources, and the like. In this example, selection factors 226 include server-side 242 selection factors and client-side 244 selection factors.

Server-side selection factors 242 represent factors provided by or known by data processing system 200. Server-side selection factors 242 may be, for example, an internet protocol (IP) address of a requesting client device, a type of device that the requesting client device is, such as a mobile client device, and date and time when a resource access request is made, which are factors that are known by or may be determined by data processing system 200. Client-side selection factors 244 represent factors provided by or known by the requesting client device. The requesting client device sends client-side selection factors 244 to data processing system 200 via a network, such as network 102 in FIG. 1. Client-side selection factors 244 may be, for example, location data, such as GPS coordinates, corresponding to the requesting client device, type of biometric sample collected from the user by the requesting client device, type of biometric device used to obtain the biometric sample from the user, and the like.

Challenges 228 represent a set of different challenges that challenge selection manager 218 may utilize to select a subset of challenges from to verify an identity of a particular user. Challenges 228 include authentication 246 challenges and context 248 challenges. Authentication challenges 246 may include, for example, a username, a password, a set of biometric samples, and the like, corresponding to the particular user. Context challenges 248 may include, for example, a date of resource access request 222, a day of the week corresponding to resource access request 222, a geographic location of the client device that sent resource access request 222, and the like.

Challenges 228 also includes equivalence class 250. An equivalence class is a grouping of challenges that have an equivalence relation between them. In other words, different challenges within authentication challenges 246 or context challenges 248 may have an equivalence relation, which make the challenges in the same equivalence class interchangeable. In other words, challenge selection manager 218 may select any of challenges within a particular equivalence class to satisfy selection factors 226.

After challenge selection manager 218 selects the appropriate subset of challenges from set of challenges 228 for a particular user, data processing system 200 sends the selected subset of challenges to the requesting client device. Subsequently, data processing system 200 receives challenge responses 230 from the requesting client device. In this example, data processing system 200 stores challenge responses 230, along with level of confidence in user identity 232 and user authentication decision 234, in memory 206. Challenge responses 230 represent a response to each challenge in the selected subset of challenges sent to the requesting client device. Challenge responses 230 may include, for example, a username, a password, a set of one or more biometric samples, location data, and the like.

Challenge selection manager 218 compares the data received in challenge responses 230 during an authentication attempt with data stored in persistent storage 208. After comparing and analyzing the data, challenge selection manager 218 calculates score per response 252. Score per response 252 represent a calculated score corresponding to each challenge response in challenge responses 230 to each challenge in the selected subset of challenges sent to the requesting client device. After calculating score per response 252, challenge selection manager 218 fuses all of the scores corresponding to challenge responses 230 to form fusion score 254.

Challenge selection manager 218 utilizes fusion score 254 to calculate level of confidence in user identity 232. Level of confidence in user identity 232 represents a degree of confidence in the true identity of the user of the requesting client device. For example, if fusion score 254 is greater than or equal to threshold level 256, then challenge selection manager 218 may calculate that level of confidence in user identity 232 is high. Conversely, if fusion score 254 is less than threshold level 256, then challenge selection manager 218 may calculate that level of confidence in user identity 232 is low. Alternatively, challenge selection manager 218 may utilize a probability of confidence in the identity of the user against a value of the resource corresponding to resource access request 222.

After calculating level of confidence in user identity 232, challenge selection manager 218 determines authentication decision 234. Authentication decision 234 may be success 258 or failure 260. Success 258 represents authorization for the user to access the resource corresponding to resource access request 222. Failure 260 represents denial of access to the resource. Data processing system 200 sends authentication decision 234 to the requesting client device.

Communications unit 210, in this example, provides for communication with other computers, data processing systems, and devices via a network, such as network 102 in FIG. 1. Communications unit 210 may provide communications using both physical and wireless communications links. The physical communications link may utilize, for example, a wire, cable, universal serial bus, or any other physical technology to establish a physical communications link for data processing system 200. The wireless communications link may utilize, for example, shortwave, high frequency, ultra high frequency, microwave, wireless fidelity (Wi-Fi), Bluetooth technology, global system for mobile communications (GSM), code division multiple access (CDMA), second-generation (2G), third-generation (3G), fourth-generation (4G), 4G Long Term Evolution (LTE), LTE Advanced, or any other wireless communication technology or standard to establish a wireless communications link for data processing system 200.

Input/output unit 212 allows for the input and output of data with other devices that may be connected to data processing system 200. For example, input/output unit 212 may provide a connection for user input through a keypad, a keyboard, a mouse, and/or some other suitable input device. Display 214 provides a mechanism to display information to a user and may include touch screen capabilities to allow the user to make on-screen selections through user interfaces or input data, for example.

Instructions for the operating system, applications, and/or programs may be located in storage devices 216, which are in communication with processor unit 204 through communications fabric 202. In this illustrative example, the instructions are in a functional form on persistent storage 208. These instructions may be loaded into memory 206 for running by processor unit 204. The processes of the different embodiments may be performed by processor unit 204 using computer implemented program instructions, which may be located in a memory, such as memory 206. These program instructions are referred to as program code, computer usable program code, or computer readable program code that may be read and run by a processor in processor unit 204. The program code, in the different embodiments, may be embodied on different physical computer readable storage devices, such as memory 206 or persistent storage 208.

Program code 262 is located in a functional form on computer readable media 264 that is selectively removable and may be loaded onto or transferred to data processing system 200 for running by processor unit 204. Program code 262 and computer readable media 264 form computer program product 266. In one example, computer readable media 264 may be computer readable storage media 268 or computer readable signal media 270. Computer readable storage media 268 may include, for example, an optical or magnetic disc that is inserted or placed into a drive or other device that is part of persistent storage 208 for transfer onto a storage device, such as a hard drive, that is part of persistent storage 208. Computer readable storage media 268 also may take the form of a persistent storage, such as a hard drive, a thumb drive, or a flash memory that is connected to data processing system 200. In some instances, computer readable storage media 268 may not be removable from data processing system 200.

Alternatively, program code 262 may be transferred to data processing system 200 using computer readable signal media 270. Computer readable signal media 270 may be, for example, a propagated data signal containing program code 262. For example, computer readable signal media 270 may be an electro-magnetic signal, an optical signal, and/or any other suitable type of signal. These signals may be transmitted over communication links, such as wireless communication links, an optical fiber cable, a coaxial cable, a wire, and/or any other suitable type of communications link. In other words, the communications link and/or the connection may be physical or wireless in the illustrative examples. The computer readable media also may take the form of non-tangible media, such as communication links or wireless transmissions containing the program code.

In some illustrative embodiments, program code 262 may be downloaded over a network to persistent storage 208 from another device or data processing system through computer readable signal media 270 for use within data processing system 200. For instance, program code stored in a computer readable storage media in a data processing system may be downloaded over a network from the data processing system to data processing system 200. The data processing system providing program code 262 may be a server computer, a client computer, or some other device capable of storing and transmitting program code 262.

The different components illustrated for data processing system 200 are not meant to provide architectural limitations to the manner in which different embodiments may be implemented. The different illustrative embodiments may be implemented in a data processing system including components in addition to, or in place of, those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a computer readable storage device in data processing system 200 is any hardware apparatus that may store data. Memory 206, persistent storage 208, and computer readable storage media 268 are examples of physical storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

In the course of developing illustrative embodiments, it was discovered that even when authentication systems use multiple factors for user authentication, typically these authentication systems assess all possibilities and select a subset of the available factors during each user authentication. These multiple factors can usually be specified by a limited number of rules to configure the authentication systems. This becomes problematic for security administrators as the number of choices increases substantially with the introduction of smarter end points, such as smart phones, tablets, and internet of things (IoT) devices, which include vehicles and home automation devices, such as thermostats and refrigerators.

In addition, authentication factors may include multiple forms of biometric authentication, such as face, voice, knowledge, signatures, gestures, and the like, which require explicit user action. Passive or soft biometrics, such as how a user walks, how the user holds a tablet, how the user interacts with a touch screen, and the like, also need to be factored in. Further, contextual factors, such as client device geographic location, need to be considered as well. Each of these authentication and contextual factors requires input from the user, the client device, or processing by the authentication system. Each of the factors contributes a certain amount of confidence, or an anomaly score, to the authentication system. Knowing how to select an appropriate and sufficient subset of these authentication and contextual factors may be a daunting task for a system administrator to manually configure.

Illustrative embodiments utilize a dynamic scheme whereby the multi-factor user authentication service determines which of the authentication and contextual factors are to be collected from the requesting client device to achieve sufficient confidence in the user's identity to mitigate the risk associated with allowing access to a protected resource. For example, given a level of risk associated with a particular transaction, such as, for example, a dollar amount corresponding to a particular financial transaction and associated historical factors regarding other financial transactions performed by the same user, illustrative embodiments calculate a required confidence level for determining an identity of the user and select among a plurality of different challenges based on a plurality of different challenge selection factors, which include both contextual factors and authentication factors, to achieve the required confidence level in the user's identity to authorize the transaction to proceed. Illustrative embodiments also consider a number of selection factor constraints, which include availability of data (e.g., unavailability of geographic location data, facial imaging data, voice data, fingerprint data, et cetera), time for the user to use a particular authentication method, time for the client device to obtain the data, time for the authentication server to process the data including network delays, and the like.

Illustrative embodiments also may introduce randomization of the authentication challenges and contextual challenges within an equivalence class to mitigate the opportunity for spoofing, replay attacks, or other types of attacks on the authentication server.

Illustrative embodiments also may utilize a knapsack approach where capacity is a maximal multidimensional burden of the selected authentication methods on the user, such as, for example, time to authenticate the user, cognitive abilities of or load on the user, and the like. Value is the authentication utility which maximizes a likelihood of correctly authenticating the user (e.g., uncertainty reduction). Weight is proportional to the cost of the authentication method across the dimensions (time, cognitive load, et cetera). Unlike the standard knapsack approach, illustrative embodiments introduce two changes: 1) capacity may be multi-dimensional; and 2) the cost and value of two items is bounded by their sum (i.e., they follow the triangle inequality property of a metric). For example, providing a known secret, such as a password more than once, does not decrease the uncertainty regarding the user's identity. Similarly, identifying the location of a user via GPS and via a WiFi access point does not provide additional location information (assuming both provide and receive good signals) or confidence. Alternatively, illustrative embodiments may utilize a search tree approach for selecting authentication methods.

Challenge selection factors, which illustrative embodiments consider, include, for example, user experience factors, environmental factors, authentication strength factors, computational cost factors, network cost factors, authentication service factors, contextual factors, user history factors, user trust level factors, and value of resource at risk factors. User experience challenge selection factors may include, for example, time needed to capture a particular biometric sample, current activity of user/environmental factors, cost of a false rejection (e.g., authentication attempt retries), impact on short term or working memory of the user and recall subject to task at hand (e.g., verbal vs. visual tasks), user preferences, user convenience/usability factors, and the like.

Illustrative embodiments may determine time to capture biometric samples by having a set of users utilize each of the biometric methods, such as, for example, face, voice, fingerprint, signature, gait, et cetera. Illustrative embodiments may determine cost of false rejection retries by measuring time/error rates and time to "recover" when unrecognized biometric samples exist. Illustrative embodiments may determine impact on user short term or working memory and user recall subject to task at hand by measuring error rates when authentication interferes with short term memory of the user. Illustrative embodiments may determine user preferences by examining a user profile, which may include static user preferences, such as no fingerprint scanning, and dynamic user preferences, such as given a choice, which authentication method does the user prefer when subject to different contexts (e.g., indoor, outdoor, geographic location, time of day, day of week, et cetera).

Environmental challenge selection factors may include, for example, signal-to-noise ratio (e.g., background noise, lighting level, et cetera), indoor/outdoor/temperature (e.g., gloves on/off, sunglasses, et cetera), lighting level (indoor/outdoor), vibration (e.g., motion caused by being in a vehicle, walking, et cetera). Illustrative embodiments may determine signal-to-noise ratio factors by modeling the effect that the signal-to-noise ratio has on authentication accuracy of each authentication method, which influences the level of confidence in the identity of the user during authentication. Also, some authentication methods are inconvenient or unfeasible based on environmental factors, such as indoor, outdoor, temperature, lighting level, vibration level, et cetera.

Authentication strength challenge selection factors may be on, for example, a per authentication method basis, across all users basis (e.g., a general model basis), a per user basis (e.g., false acceptance rate/false rejection rate per user), a per context basis (e.g., selection is influenced by environmental factors), and the like. Illustrative embodiments also may utilize known attack models against the different authentication methods (e.g., password reuse, social engineering attacks, stolen authentication token, et cetera) to determine challenge selection.

Computational cost challenge selection factors may include, for example, cost of acquisition on a client device (e.g., time required for acquisition, battery power consumption, processing power required, memory required, et cetera). Network or protocol cost challenge selection factors may include, for example, latency, throughput, estimated cost of transmission, and the like. Authentication service challenge selection factors may include, for example, latency, throughput, estimated processor load, legal/governance constraints on collecting and storing personal user data, and the like.

Contextual challenge selection factors may include, for example, time of day, day of week, geographic location of the client device used by user, passive secondary factors, such as security tokens (e.g., Bluetooth technology) and hardware tokens, which require a particular device to be in close proximity during the user authentication process. User history challenge selection factors may include, for example, authentication method factors, such as false positive rates and false negative rates corresponding to particular authentication methods utilized by the user, location and environmental factors, and the like.

User trust level challenge selection factors may be influenced by, for example, a security administrator increasing or decreasing a trust level corresponding to a particular user or group that the particular user is a member of based on history, requiring more or less trust based on the particular user or group membership, decreasing trust in the particular user or group as a result of previous losses, increasing trust in the particular user or group based on lack of losses over time, and the like. Value of resource at risk challenge selection factors may include, for example, cost of the resource or other quantification of value corresponding to the resource at risk.

With reference now to FIG. 3, a diagram of an example user authentication system is depicted in accordance with an illustrative embodiment. User authentication system 300 may be implemented in, for example, a network of data processing systems, such as network data processing system 100 in FIG. 1.

In this example, user authentication system 300 includes authentication server 302 and client device 304. However, it should be noted that user authentication system 300 may include any number of authentication servers and client devices connected via one or more networks, such as network 102 in FIG. 1. Authentication server 302 may be, for example, server 104 in FIG. 1. Client device 304 may be, for example, client 112 in FIG. 1.

In this example, authentication server 302 includes challenge selection manager 306, server-side selection factors 308, challenges 310, scores 312, and level of confidence in user identity 314, such as challenge selection manager 218, server-side selection factors 242, challenges 228, score per response 252, and level of confidence in user identity 232 in FIG. 2. Also in this example, client 304 includes authentication data 316, biometric device 318, location data 320, and location sensing device 322. However, it should be noted that authentication server 302 and client device 304 may include more or fewer components than illustrated.

Client device 304 sends resource access request 324 to authentication server 302. Resource access request 324 is a request to access a resource, such as a resource in resources 110 in FIG. 1, which is protected by authentication server 302. After receiving resource access request 324, challenge selection manager 306 may determine that client-side selection factors are needed in addition to server-side selection factors 308 in order to select an appropriate set of two or more challenges from challenges 310 to achieve a required level of confidence in an identity of a user of client device 304. Consequently, challenge selection manager 306 sends request for client-side selection factors 326 to client device 304. In response, client device 304 sends client-side selection factors 328 to authentication server 302. Client-side selection factors 328 may be, for example, client-side selection factors 244 in FIG. 2.

Challenge selection manager 306 utilizes server-side selection factors 308 and client-side selection factors 328 to select the set of authentication and/or contextual challenges from challenges 310 to achieve the required level of confidence in the identity of the user of client device 304 to authorize access to the protected resource associated with resource access request 324. Afterward, challenge selection manager 306 sends set of selected challenges 332 to client device 304. In response, client device 304 collects authentication data 316, which correspond to each challenge in set of selected challenges 332. Authentication data 316 may include, for example, username, password, set of biometric samples, or any combination thereof. Client device 304 may obtain a biometric sample of the user by utilizing biometric device 318. Biometric device 318 may be, for example, a fingerprint scanner, a palm scanner, a retinal scanner, a facial scanner, a voice scanner, a magnetic resonance imaging scanner, a computer-assisted tomography scanner, an electroencephalogram, an electrocardiogram, and the like coupled to client device 304.

Authentication data 316 also may include location data 320. Location data 320 is information that identifies a current geographic position of client device 304. Location data 320 may be, for example, GPS coordinates. Client device 304 may obtain location data 320 from location sensing device 322. Location sensing device 322 may be, for example, a GPS transceiver device, WiFi access point, or any other device that provides absolute and/or relative location information.

Subsequently, client device 304 sends responses to set of selected challenges 332, which includes authentication data 316, to authentication server 302. Challenge selection manager 306 analyzes each response in responses to set of selected challenges 332 and generates a score for each response to form scores 312. In addition, challenge selection manager 306 may fuse each score in scores 312 to generate a fusion score, such as fusion score 254 in FIG. 2. Based on scores 312, challenge selection manager 306 calculates level of confidence in user identity 314. It should be noted that challenge selection manager 306 may decide to repeat 326 through 332 based on calculated level of confidence in user identity 314. Afterward, challenge selection manager 306 generates authentication decision 334, such as authentication decision 234 in FIG. 2, and sends authentication decision 334 to client device 304. Authentication decision 334 may be an authorization to access the resource corresponding to resource access request 324, such as success 258 in FIG. 2, or may be a denial of access to the requested resource, such as failure 260 in FIG. 2.

Figure 4:
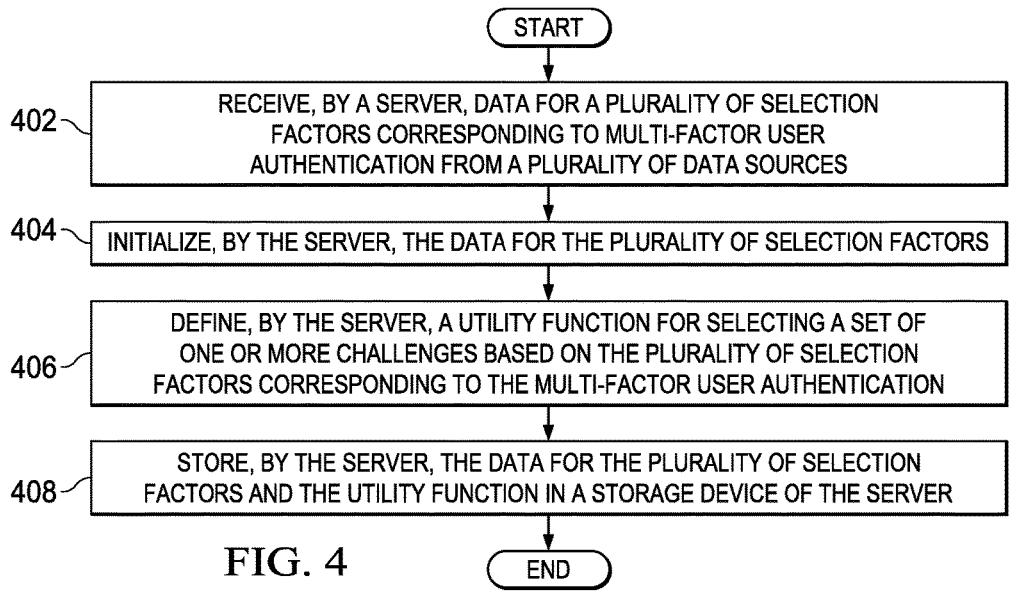
FIG. 4 is a flowchart illustrating a process for initializing a multi-factor user authentication service in accordance with an alternative illustrative embodiment.

With reference now to FIG. 4, a flowchart illustrating a process for initializing a multi-factor user authentication service is shown in accordance with an illustrative embodiment. The process shown in FIG. 4 may be implemented in a server computer, such as, for example, data processing system 200 in FIG. 2 or authentication server 302 in FIG. 3.

The process begins when the server receives data for a plurality of selection factors corresponding to multi-factor user authentication from a plurality of data sources (step 402). The server initializes the data for the plurality of selection factors (step 404). The server also defines a utility function for selecting a set of one or more challenges based on the plurality of selection factors corresponding to the multi-factor user authentication (step 406). In addition, the server stores the data for the plurality of selection factors and the utility function in a storage device of the server (step 408). Thereafter, the process terminates.

Figure 5B:
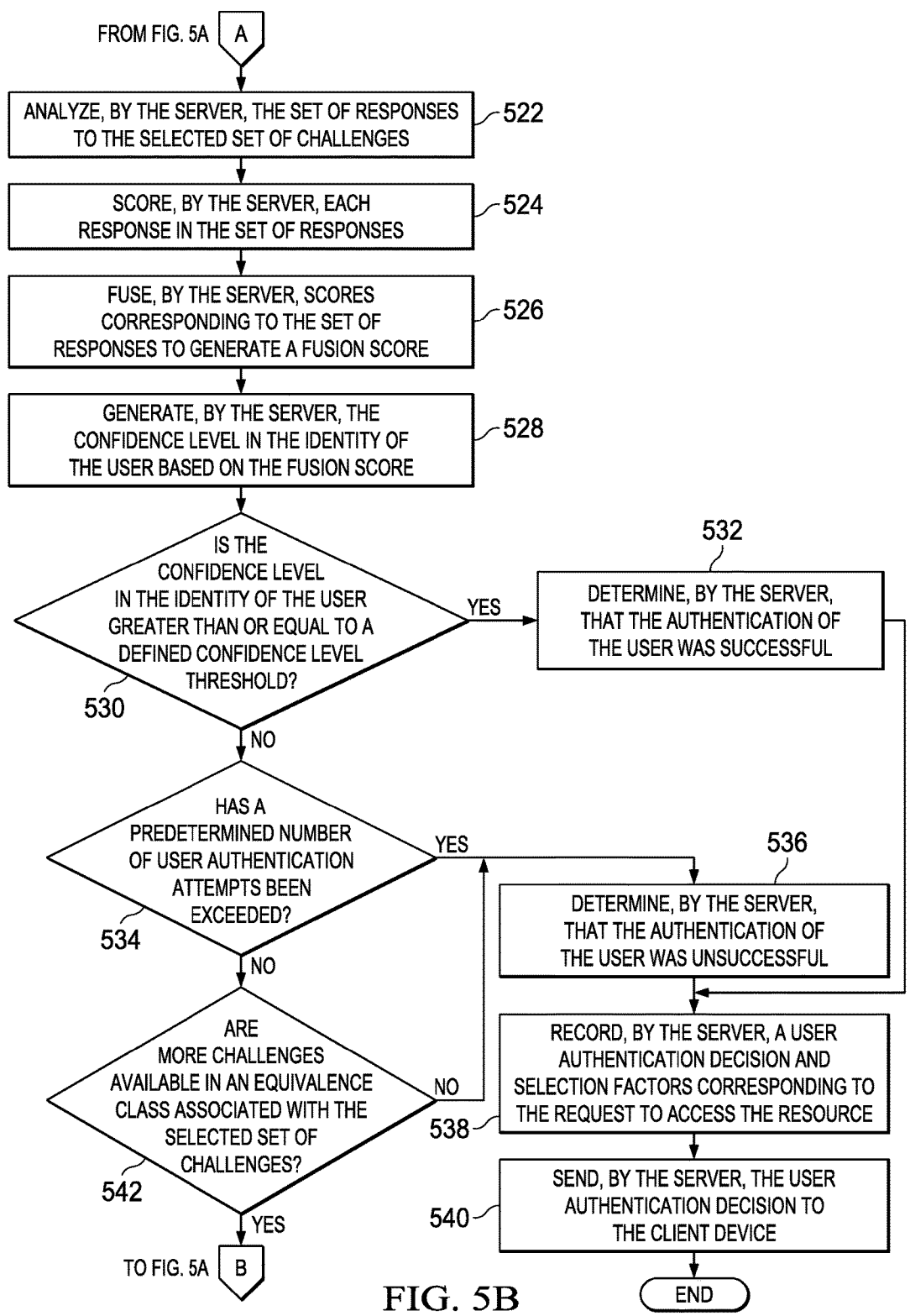

With reference now to FIGS. 5A-5B, a flowchart illustrating a process for selecting challenges in multi-factor user authentication is shown in accordance with an illustrative embodiment. The process shown in FIGS. 5A-5B may be implemented in a server computer, such as, for example, data processing system 200 in FIG. 2 or authentication server 302 in FIG. 3.

The process begins when the server receives a request from a client device to access a resource via a network (step 502). The request from the client device to access the resource may be, for example, resource access request 324 from client device 304 in FIG. 3. The network may be, for example, network 102 in FIG. 1.

In addition, the server determines that authentication of a user of the client device is required to access the resource (step 504). Further, the server determines a level of confidence in an identity of the user of the client device required for authorization to access the resource (step 506). The level of confidence in the identity of the user of the client device may be, for example, level of confidence in user identity 314 in FIG. 3.

Furthermore, the server determines a set of server-side selection factors corresponding to multi-factor user authentication to achieve the level of confidence in the identity of the user to authorize access to the resource (step 508). The set of server-side selection factors may be, for example, server-side selection factors 308 in FIG. 3. The server also makes a determination as to whether client-side selection factors are needed (step 510). The client-side selection factors may be, for example, client side selection factors 244 in FIG. 2.

If the server determines that client-side selection factors are needed, yes output of step 510, then the server sends a request to the client device for a set of client-side selection factors corresponding to the multi-factor user authentication to achieve the level of confidence in the identity of the user to authorize access to the resource (step 512). The request to the client device for the set of client-side selection factors may be, for example, request for client-side selection factors 326 in FIG. 3. Subsequently, the server receives the set of client-side selection factors corresponding to the multi-factor user authentication from the client device (step 514). The set of client-side selection factors may be, for example, client-side selection factors 328 in FIG. 3. Thereafter, the process proceeds to step 516.

Returning again to step 510, if the server determines that client-side selection factors are not needed, no output of step 510, then the process proceeds to step 516. In step 516 the server selects a set of challenges to send to the client device based on at least one of the set of server-side selection factors and the set of client-side selection factors when determined to be needed (step 516). Afterward, the server sends the selected set of challenges to the client device (step 518). The selected set of challenges may be, for example, set of selected challenges 330 in FIG. 3.

Subsequently, the server receives a set of responses to the selected set of challenges from the client device (step 520). The set of responses to the selected set of challenges may be, for example, responses to set of selected challenges 332 in FIG. 3. In addition, the server analyzes the set of responses to the selected set of authentication challenges (step 522). Further, the server scores each response in the set of responses (step 524). The score for each response may be, for example, scores 312 in FIG. 3. Furthermore, the server fuses scores corresponding to the set of responses to generate a fusion score (step 526). The fusion score may be, for example, fusion score 254 in FIG. 2.

Afterward, the server generates the confidence level in the identity of the user based on the fusion score (step 528). Then, the server makes a determination as to whether the confidence level in the identity of the user is greater than a defined confidence level threshold (step 530). The defined confidence level threshold may be, for example, threshold level 256 in FIG. 2.

If the server determines that the confidence level in the identity of the user is greater than or equal to the defined confidence level threshold, yes output of step 530, then the server determines that the authentication of the user was successful (step 532) and the process proceeds to step 538 thereafter. If the server determines that the confidence level in the identity of the user is not greater than the defined confidence level threshold, no output of step 530, then the server makes a determination as to whether a predetermined number of user authentication attempts has been exceeded (step 534). If the server determines that the predetermined number of user authentication attempts has been exceeded, yes output of step 534, then the server determines that the authentication of the user was unsuccessful (step 536).

In addition, the server records a user authentication decision and selection factors corresponding to the request to access the resource (step 538). The server also sends the user authentication decision to the client device (step 540) and the process terminates thereafter. The user authentication decision may be, for example, authentication decision 334 in FIG. 3.

Returning again to step 534, if the server determines that the predetermined number of user authentication attempts has not been exceeded, no output of step 534, then the server makes a determination as to whether more challenges are available in an equivalence class associated with the selected set of challenges (step 542). The equivalence class may be, for example, equivalence class 250 in FIG. 2. If the server determines that no more challenges are available in an equivalence class associated with the selected set of challenges, no output of step 542, then the process returns to step 536 where the server determines that the authentication of the user was unsuccessful. If the server determines that more challenges are available in an equivalence class associated with the selected set of challenges, yes output of step 542, then the process returns to step 506 where the server determines a new level of confidence in the identity of the user required for authorization to access the resource.

Figure 6:
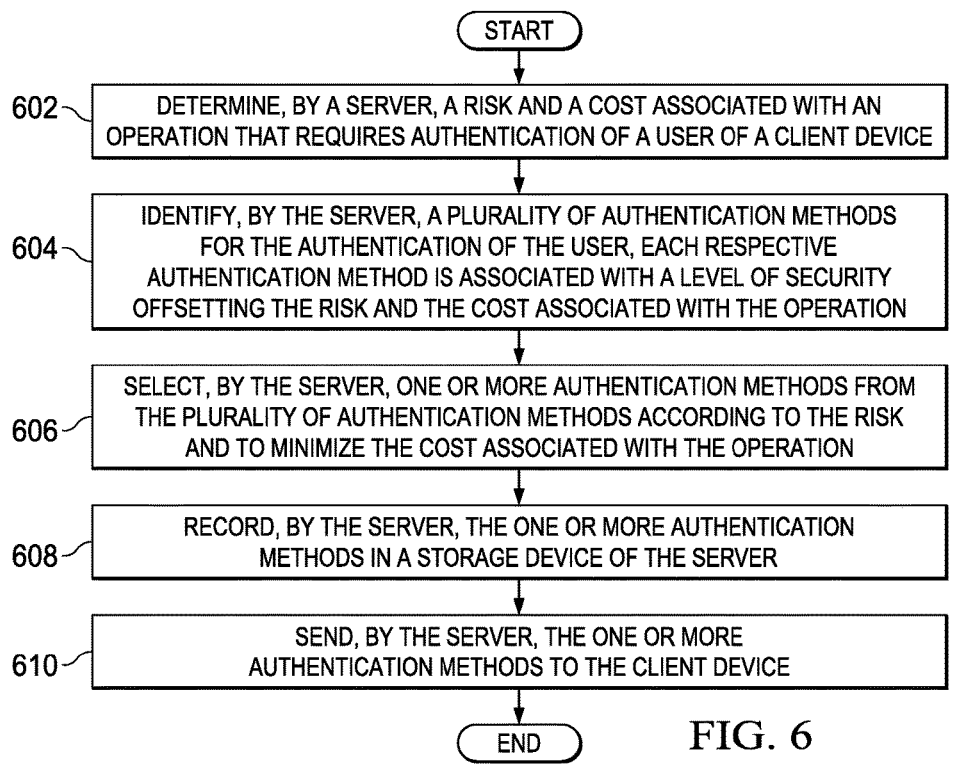
FIG. 6 is a flowchart illustrating a process for selecting authentication methods in accordance with an alternative illustrative embodiment.

With reference now to FIG. 6, a flowchart illustrating a process for selecting authentication methods is shown in accordance with an alternative illustrative embodiment. The process shown in FIG. 6 may be implemented in a server computer, such as, for example, data processing system 200 in FIG. 2 or authentication server 302 in FIG. 3.

The process begins when the server determines a risk and a cost associated with an operation that requires authentication of a user of a client device (step 602). The client device may be, for example, client 110 in FIG. 1 or client device 304 in FIG. 3. In addition, the server identifies a plurality of authentication methods for the authentication of the user (step 604). Each respective authentication method is associated with a level of security offsetting the risk and the cost associated with the operation. Further, the server selects one or more authentication methods from the plurality of authentication methods according to the risk and to minimize the cost associated with the operation (step 606). The server also records the one or more authentication methods in a storage device of the server, such as persistent storage 208 in FIG. 2 (step 608). Then, the server sends the one or more authentication methods to the client device via a network, such as network 102 in FIG. 1 (step 610).

It should be noted that each respective authentication method has an associated cost and that the server selects the one or more authentication methods to minimize an aggregate cost of the authentication. Furthermore, it should be noted that a set of two or more respective authentications methods may have an equivalent associated cost and that the server may randomize which respective authentication method is selected to minimize spoofing. Also, each respective authentication method has an associated user convenience or usability factor and the server selects the one or more authentication methods to maximize an aggregate user convenience that satisfies the risk associated with the operation. Moreover, the server may select the one or more authentication methods based on a history of authentication method selection by the server for a given operation requiring user authentication. In addition, the server may select a different authentication method than a most recently selected authentication method according to the history of authentication method selection to minimize replay attacks on the server.

Thus, illustrative embodiments of the present invention provide a computer-implemented method, computer system, and computer program product for selecting a set of two or more challenges to determine a level of confidence in an identity of a user based on a plurality of selection factors in a multi-factor user authentication process. The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A computer-implemented method for dynamic multi-factor authentication challenge selection to control access to protected network resources, the computer-implemented method comprising:
    determining, by a computer, a risk associated with an operation to access a resource connected to a network that requires authentication of a user of a client device;
    identifying, by the computer, a plurality of authentication methods, each respective authentication method associated with a level of security offsetting the risk and a computing cost associated with a respective authentication method;
    sending, by the computer responsive to the computer determining that a set of client-side selection factors maintained at the client device are needed to achieve a required confidence level in an identity of the user, a request for the set of client-side selection factors to the client device;
    responsive to the computer requesting the set of client-side selection factors from the client device, receiving, by the computer, the set of client-side selection factors of time and memory needed to capture a biometric sample by the client device;
    selecting, by the computer, a set of authentication methods from the plurality of authentication methods to send to the client device to achieve the required confidence level in the identity of the user based on a set of server-side selection factors maintained at the computer and the set of client-side selection factors received by the computer to minimize the risk and the computing cost associated with authenticating the operation to access the resource connected to the network;
    sending, by the computer, the selected set of authentication methods to the client device;
    responsive to the computer determining that a confidence level in the identity of the user is less than a defined confidence level threshold based on a score corresponding to one or more responses received from the client device to the selected set of authentication methods, determining, by the computer, whether more authentication methods having an equivalent associated computing cost exist in an equivalence class associated with the selected set of authentication methods, wherein the equivalence class is a group of interchangeable challenges having an equivalence relation between them to satisfy the set of client-side selection factors;
    responsive to the computer determining that no more authentication methods having the equivalent associated computing cost exist in the equivalence class associated with the selected set of authentication methods, determining, by the computer, that the authentication of the user was unsuccessful; and
    denying, by the computer, access by the client device to the resource connected to the network based on the unsuccessful authentication of the user.

2. The computer-implemented method of claim 1, wherein each respective authentication method has an associated user convenience factor, and wherein the computer selects the selected set of authentication methods to maximize an aggregate user convenience that satisfies the risk associated with the operation to access the resource connected to the network.

3. The computer-implemented method of claim 1, wherein the computer randomizes which respective authentication method is selected to minimize spoofing.

4. The computer-implemented method of claim 1, wherein the computer selects the selected set of authentication methods based on a history of authentication method selection by the computer for a given operation to access a particular resource connected to the network requiring user authentication.

5. The computer-implemented method of claim 4, wherein the computer selects a different authentication method than a most recently selected authentication method according to the history of authentication method selection to minimize replay attacks on the computer.

6. The computer-implemented method of claim 1 further comprising:
    analyze, by the computer, a set of responses to the selected set of authentication methods, wherein each response in the set of responses corresponds to a respective authentication method in the selected set of authentication methods;
    scoring, by the computer, each response in the set of responses;
    fusing, by the computer, scores corresponding to the set of responses to generate a fusion score; and
    generating, by the computer, the confidence level in the identity of the user of the client device based on the fusion score.

7. The computer-implemented method of claim 1 further comprising:
    responsive to the computer determining that the confidence level in the identity of the user is greater than or equal to the defined confidence level threshold, determining, by the computer, that the authentication of the user was successful; and
    authorizing, by the computer, access by the client device to the resource connected to the network based on the successful authentication of the user.

8. The computer-implemented method of claim 1 further comprising:
    responsive to the computer determining that more authentication methods having the equivalent associated computing cost exist in the equivalence class associated with the selected set of authentication methods, repeating, by the computer, steps to generate a new confidence level in the identity of the user.

9. The computer-implemented method of claim 1, wherein the plurality of authentication methods include authentication challenges and contextual challenges.

10. The computer-implemented method of claim 1, wherein authentication method selection factors are selected from a group consisting of user experience factors, environmental factors, authentication strength factors, computational cost factors, network cost factors, authentication service factors, contextual factors, user history factors, user trust level factors, and value of resource at risk factors.

11. A computer system for dynamic multi-factor authentication challenge selection to control access to protected network resources, the computer system comprising:
a bus system;
a storage device connected to the bus system, wherein the storage device stores program instructions; and
a processor connected to the bus system, wherein the processor executes the program instructions to:
determine a risk associated with an operation to access a resource connected to a network that requires authentication of a user of a client device;
identify a plurality of authentication methods, each respective authentication method associated with a level of security offsetting the risk and a computing cost associated with a respective authentication method;
send, responsive to determining that a set of client-side selection factors maintained at the client device are needed to achieve a required confidence level in an identity of the user, a request for the set of client-side selection factors to the client device;
receive the set of client-side selection factors of time and memory needed to capture a biometric sample by the client device in response to requesting the set of client-side selection factors from the client device;
select a set of authentication methods from the plurality of authentication methods to send to the client device to achieve the required confidence level in the identity of the user based on a set of server-side selection factors maintained at the computer system and the set of client-side selection factors received by the computer system to minimize the risk and the computing cost associated with authenticating the operation to access the resource connected to the network;
send the selected set of authentication methods to the client device;
determine whether more authentication methods having an equivalent associated computing cost exist in an equivalence class associated with the selected set of authentication methods in response to determining that a confidence level in an identity of the user is less than a defined confidence level threshold based on a score corresponding to one or more responses received from the client device to the selected set of authentication methods, wherein the equivalence class is a group of interchangeable challenges having an equivalence relation between them to satisfy the set of client-side selection factors;
determine that the authentication of the user was unsuccessful in response to determining that no more authentication methods having the equivalent associated computing cost exist in the equivalence class associated with the selected set of authentication methods; and
deny access by the client device to the resource connected to the network based on the unsuccessful authentication of the user.

12. A computer program product for dynamic multi-factor authentication challenge selection to control access to protected network resources, the computer program product comprising a computer readable storage medium having program instructions embodied therewith, the program instructions executable by a computer to cause the computer to perform a method comprising:
determining, by the computer, a risk associated with an operation to access a resource connected to a network that requires authentication of a user of a client device;
identifying, by the computer, a plurality of authentication methods, each respective authentication method associated with a level of security offsetting the risk and a computing cost associated with a respective authentication method;
sending, by the computer responsive to the computer determining that a set of client-side selection factors maintained at the client device are needed to achieve a required confidence level in an identity of the user, a request for the set of client-side selection factors to the client device;
responsive to the computer requesting the set of client-side selection factors from the client device, receiving, by the computer, the set of client-side selection factors of time and memory needed to capture a biometric sample by the client device;
selecting, by the computer, a set of authentication methods from the plurality of authentication methods to send to the client device to achieve the required confidence level in the identity of the user based on a set of server-side selection factors maintained at the computer and the set of client-side selection factors received by the computer to minimize the risk and the computing cost associated with authenticating the operation to access the resource connected to the network;
sending, by the computer, the selected set of authentication methods to the client device;
responsive to the computer determining that a confidence level in an identity of the user is less than a defined confidence level threshold based on a score corresponding to one or more responses received from the client device to the selected set of authentication methods, determining, by the computer, whether more authentication methods having an equivalent associated computing cost exist in an equivalence class associated with the selected set of authentication methods, wherein the equivalence class is a group of interchangeable challenges having an equivalence relation between them to satisfy the set of client-side selection factors;
responsive to the computer determining that no more authentication methods having the equivalent associated computing cost exist in the equivalence class associated with the selected set of authentication methods, determining, by the computer, that the authentication of the user was unsuccessful; and
denying, by the computer, access by the client device to the resource connected to the network based on the unsuccessful authentication of the user.

13. The computer program product of claim 12, wherein each respective authentication method has an associated user convenience factor, and wherein the computer selects the selected set of authentication methods to maximize an aggregate user convenience that satisfies the risk associated with the operation to access the resource connected to the network.

14. The computer program product of claim 12, wherein the computer randomizes which respective authentication method is selected to minimize spoofing.

15. The computer program product of claim 12, wherein the computer selects the selected set of authentication methods based on a history of authentication method selection by the computer for a given operation to access a particular resource connected to the network requiring user authentication.

16. The computer program product of claim 15, wherein the computer selects a different authentication method than a most recently selected authentication method according to the history of authentication method selection to minimize replay attacks on the computer.

\* \* \* \* \*